United States Patent [19]

Potter et al.

[11] E Re. 30,980

[45] Reissued Jun. 29, 1982

[54] WALL SYSTEM

[75] Inventors: Timothy K. Potter, Trollhättan; Raimundo Lopez Gomez, Vänersborg, both of Sweden

[73] Assignee: Gotaverken Aluminum AB, Gothenburg, Sweden

[21] Appl. No.: 243,277

[22] Filed: Mar. 13, 1981

Related U.S. Patent Documents

Reissue of:

[64] Patent No.: 4,223,504
Issued: Sep. 23, 1980
Appl. No.: 928,034
Filed: Jul. 25, 1978

[30] Foreign Application Priority Data

Aug. 1, 1977 [SE] Sweden ..... 7708761

[51] Int. Cl.[3] ..... E04B 2/60
[52] U.S. Cl. ..... 52/479; 52/729
[58] Field of Search ..... 52/479–481, 52/729, 476, 477

[56] References Cited

U.S. PATENT DOCUMENTS

| | | | |
|---|---|---|---|
| 2,017,441 | 10/1935 | Kotrbaty | 52/729 |
| 2,589,304 | 3/1952 | Spangler | 52/729 |
| 3,037,590 | 6/1962 | Pavlecka | 52/481 |
| 3,436,884 | 4/1969 | Bell et al. | 49/501 |

FOREIGN PATENT DOCUMENTS

| | | | |
|---|---|---|---|
| 2235392 | 2/1974 | Fed. Rep. of Germany | 49/DIG. 1 |

*Primary Examiner*—James L. Ridgill, Jr.
*Attorney, Agent, or Firm*—Pollock, Vande Sande & Priddy

[57] ABSTRACT

An interlocking frame assembly for constructing and supporting a wall system, wherein a plurality of substantially H-shaped support sections are each formed with a pair of flange members extending substantially perpendicularly from a side thereof, with each pair of flange members having a pair of inwardly directed projections and each pair of leg members forming the H-shaped support section also having a pair of inwardly directed projections. A plurality of connecting sections are selectively positionable to engage the inwardly projecting projections of separate support sections to interconnect said support sections in perpendicular or parallel arrangement relative to one another.

17 Claims, 4 Drawing Figures

WALL SYSTEM

Matter enclosed in heavy brackets [ ] appears in the original patent but forms no part of this reissue specification; matter printed in italics indicates the additions made by reissue.

BACKGROUND OF THE INVENTION

This invention relates to a wall system frame assembly comprising substantially two types of metal sections, by means of which the walls of a building can be erected in a simple manner.

It is conventional to erect building walls of frame structures consisting of metal sections, which have been coupled together. However, in the past, it has not been possible to form a wall system without using a great number of different sections and utilizing special tools and machines. This in its turn, significantly increased the difficulty in transporting materials, as well as requiring relatively large staff of specially trained personnel. Consequently, the overall costs of forming the wall system tended to be exceedingly high.

The present, by comparison, renders it possible in a simple and work-saving manner to erect building wall systems which comprise a relatively few standardized elements.

BRIEF DESCRIPTION OF THE DRAWINGS

The present invention is described in greater detail in the following, by way of the preferred embodiment and with reference to the accompanying drawing, in which.

DETAILED DESCRIPTION OF THE PREFERRED EMBODIMENTS

Figure 1:
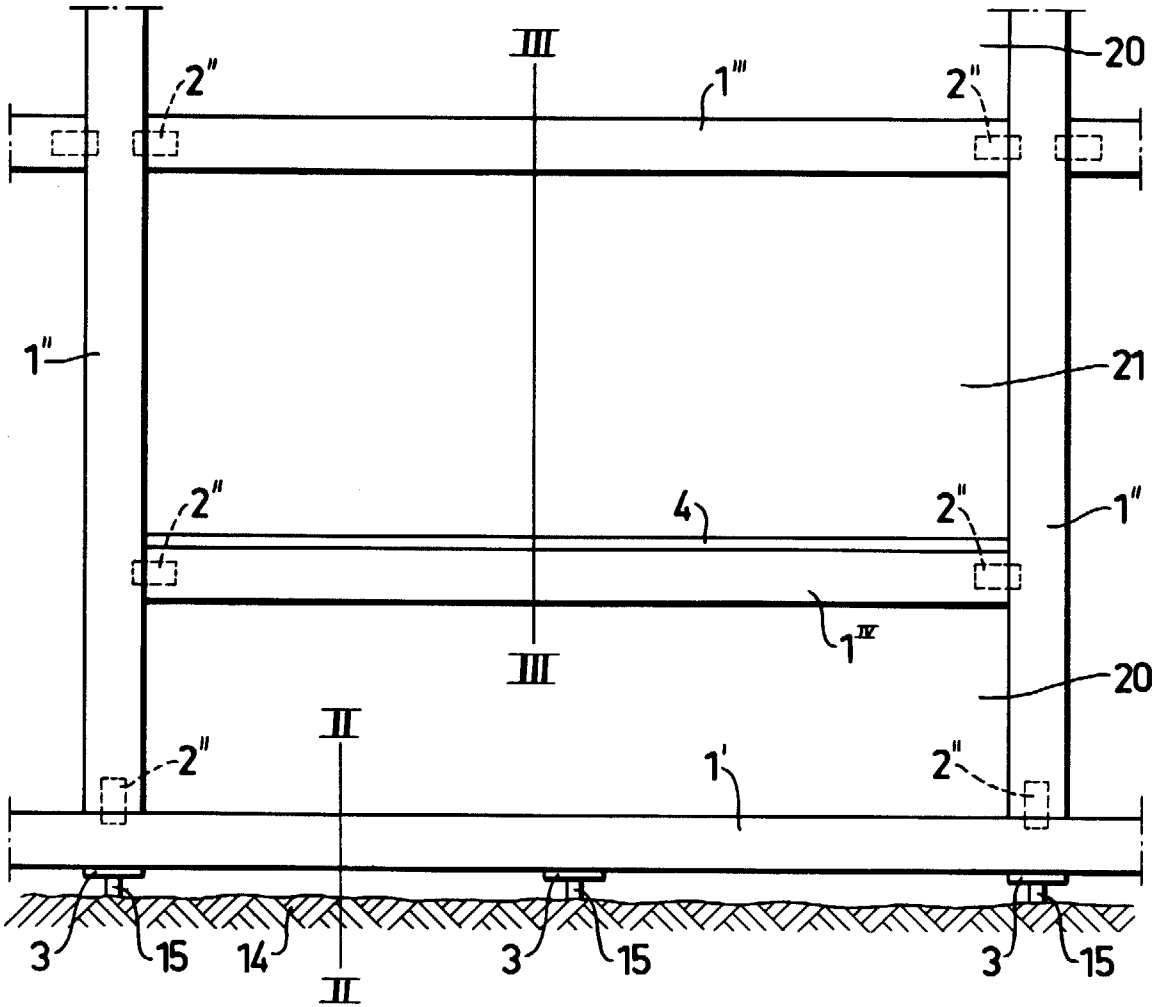
FIG. 1 shows a schematic, lateral view of a wall system formed in accordance with the present invention.

A wall system frame assembly according to the present invention includes a first type of section, generally designated support section 1, and a second type of section generally designated connecting section 2. These sections can be complemented by third and fourth types of sections 3 and 4 respectively. The various types of sections comprising the preferred embodiment are each made of aluminium according a some conventional method.

The support section 1 has a substantially H-shaped configuration formed by two pairs of oppositely directed leg members which are provided with confronting leg surfaces having inwardly directed projections 5 formed on the ends thereof. Each support section 1 is further provided with at least one pair of parallel extending flange members on one outside portion and symmetrically positioned on either side of the section center of support section 1, which flanges support projections 6 directed inwardly toward each other. A web portion 7 of support section 1 is located about 10 mm from the section centre, and a pair of guide edges 8 are arranged about 10 mm on the opposite side of the section centre within the section.

Figure 3:
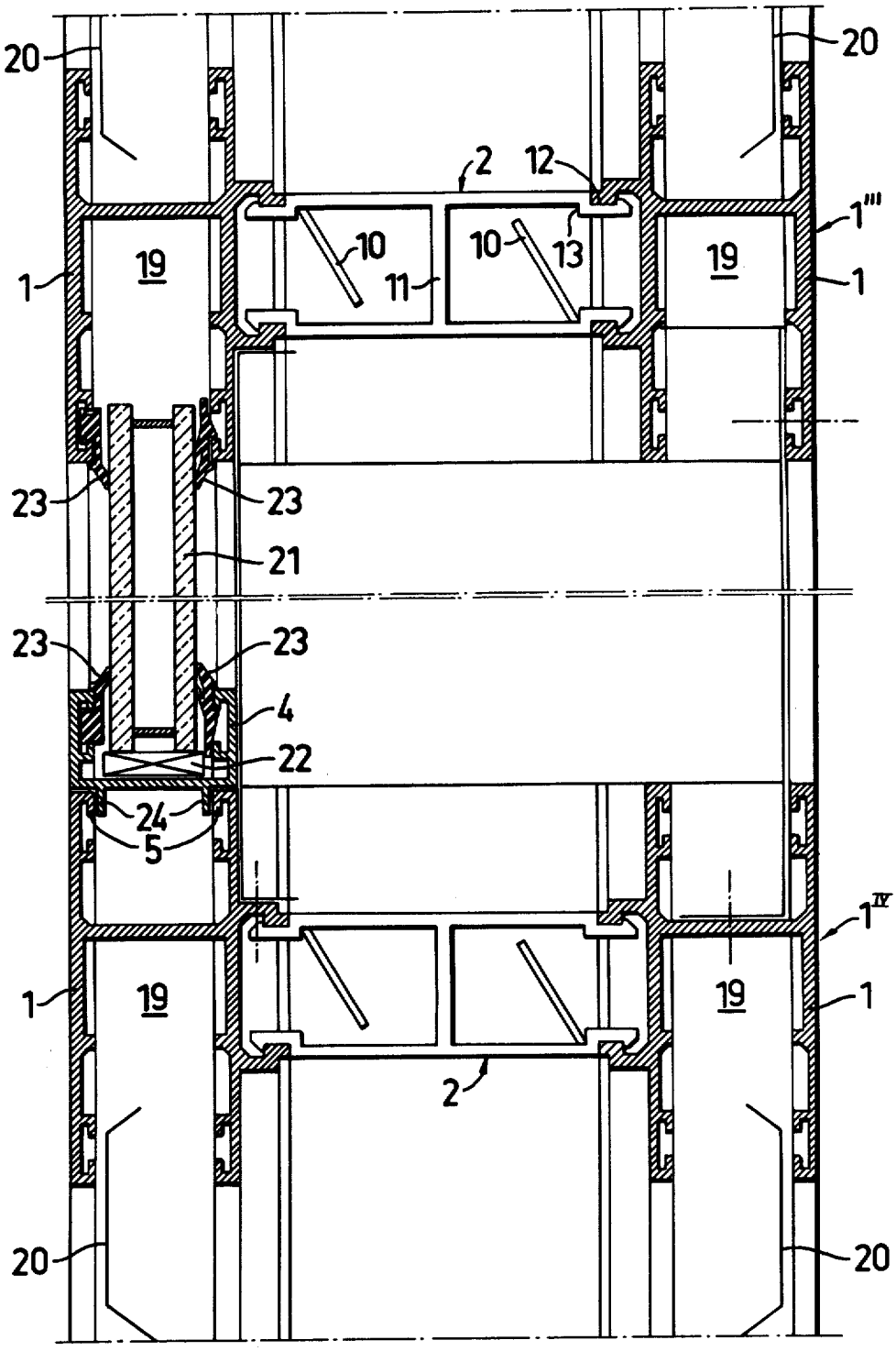
in FIG. 3 shows a section through the wall system taken along the line III—III in FIG. 1.

Connecting section 2 has a substantially H-shaped configuration including two pairs of oppositely directed leg members of which opposed, outer leg surfaces formed with are provided with outwardly directed projections 9 in the form of hooks, which are countersunk slightly in relation to the lateral surfaces of connecting section 2. Connecting section 2 further includes a tongue-like locking section 10, which is drawn integral with connecting section 2 and is inclined inwardly to the section centre from a leg end on each side of the web portion 11 (FIG. 3). Owing to the design of the legs, an outer and an inner stop member 12 and 13, respectively, are formed in the respective leg end of section 2.

For a better understanding, the present invention is described in the following as the wall system can be imagined as being erected.

Figure 2:
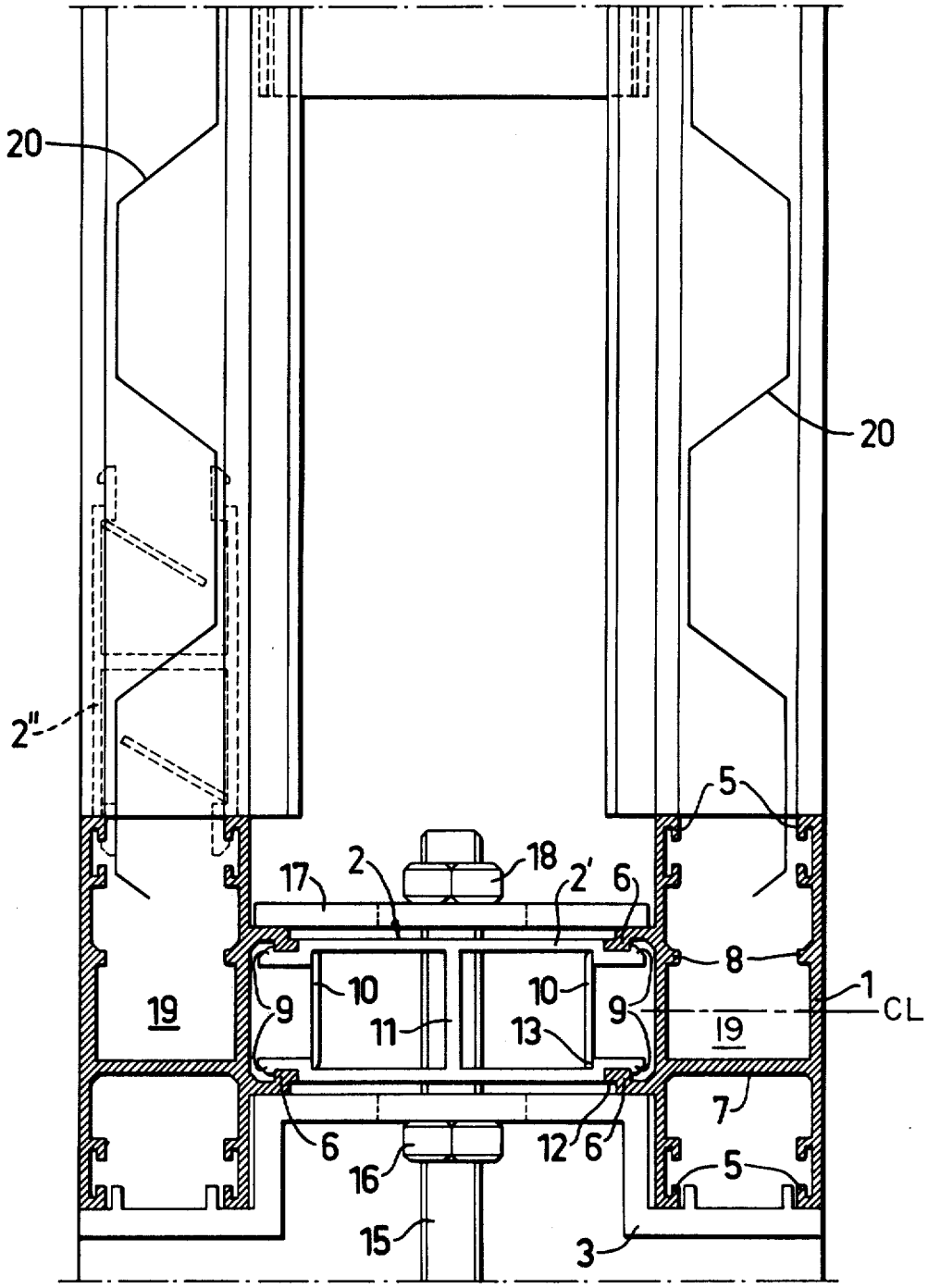
FIG. 2 shows a section through the wall system of FIG. 1, taken along the line II—II.

Support sections 1 are cut to predetermined lengths, and are mounted in pairs on parallel to the side of each other. Specific lengths 2 of the second type of connecting section 2 are positioned in suitably-spaced relationship and are attached by snapping between the support sections 1. In the preferred embodiment, the connecting sections 2' have a length of substantially 50 mm. Due to the fact that the projection 6 upon said snap-attachment of the connecting section 2' is located between the hook 9 and the outer stop member 12, the support section 1 is fixed relative to the connecting section 2'. In order to prevent unintentional inward bending of the legs of connecting section 2' after the mounting, and in order to frictionally lock connecting section 2' to support section 1, the tongue-like locking sections 10 are bent upward against the stop member 13 (FIG. 2). For the wall system now being erected, one support section 1 forms the outside of the wall and one further support section 1 forms the inside of the wall.

In order to support and attach the bottom support section or sill 1' (FIG. 1) to the wall system, preferably parts of a third type of section 3, which is generally designated as the attachment section, and which is fixed to the support section and ground 14 at equally spaced, intervals forming a row well leveled in height. This is carried out preferably so, that the fixing portion of the attachment section consists of a threaded metal rod 15, which is cast in the support (ground) and onto which a nut 16 has been screwed to desired levelled height on which rod is the section 3 rests. The shape of the section 3 is shown in FIG. 2 as including a substantially straight middle portion and a pair of L-shaped end portions attached to either end of the middle portion to provide good guidance in the lateral direction of the sill 1'. The sill further can be locked to the attachment section 3 by means of a plate 17 and nut 18, as shown in FIG. 2.

The mounting of upright support sections 1'', which are comprised in the wall system and, like the sills 1' are formed of double support sections 1, is carried out in such a manner, that lengths 2'' of the connecting section 2 are snappingly attached to the leg ends of the support section 1. Said lengths 2'' of the connecting section 2 have in the preferred embodiment shown a length of substantially 20 mm and are attached by snapping in the places to be of the upright support sections 1''. The uprights now are moved down over the connecting sections 2'', so that these connecting sections are located in the space 19 of the particular support section 1 in question. The space 19, thus, is the one formed between the web portion 7 of the support section 1 and the pair of guide edges 8. The respective tongue-like locking section 10, which is easily accessible between the legs of the support section 1, is bent as stated previously for locking the lengths of connecting sections 22 to the sills 1'. The support section 1 and the lengths 2'' of connecting section 2 also can be attached to each other by rivets.

The wall sheets 20 constituting the wall surfaces have such a width, that their edges extend in between the leg members of each of the opposed support sections 1 comprised in two uprights 1'' positioned to the side of each other. The sheets 20 are mounted in the wall system by simply being moved down from above between the uprights and the support section leg members thereof before support sections 1 generally indicated by the horizontal girders 1''' of the same type as the sills and uprights are mounted. The sheets 20 are locked in a suitable manner to the sections, and the space between the sheets is filled with some type of insulation (not shown).

A horizontal girder 1''' or a horizontally attached window part $1^{IV}$ are mounted as follows.

The horizontal girder 1''' or the horizontal window part $1^{IV}$ consist, as mentioned before, of the parallel extending support sections 1, which are coupled together by means of specific lengths of the connecting section 2 having a length of substantially 50 mm. The girder or part is cut to a length corresponding to the distance between adjacently positioned upright support sections 1''. At the ends of the support sections forming the girder 1''', the 20 mm long lengths 2'' of the connecting sections 2 are inserted into the respective space 19, and the girder 1' is attached between the uprights 1''. The lengths 2'' of the connecting section 2 now are knocked or pressed against the uprights 1'', so that the leg members of the connecting sections 2'' snappingly engage with the inwardly directed projections 6 of the respective main section 1. After the girder has been finely adjusted, the locking sections 10 are knocked into locking position. The locking can be completed by riveting or screwing.

A window glass 21 (FIGS. 1 and 3) to be mounted between, for example, the window part $1^{IV}$ and the girder 1''', is mounted as follows. The window glass 21, which is slightly wider but slightly smaller in height than the opening formed between the uprights 1'' and the girder and, respectively, window part, is moved with one edge in between the legs in the intended support section for one upright 1'', brought with the opposite edge into flushing alignment with the corresponding intermediate space between the leg members of the opposite upright 1'', and is moved back some distance so that the two vertical edges of the window glass now are between the leg members of the respective support section. The window glass is thereafter lifted so that its upper edge is located between the section legs concerned in the girder 1'''. A receiving section 4 with a length corresponding to that of the window part $1^{IV}$ thereafter is laid on said part, and the window glass is lowered to rest on blocks 22 laid into the receiving section 4. The section 4 has such a height that with the glass resting on the blocks 22 the upper edge of the glass still is between the legs of the girder 1'''. Suitable rubber strips 23 complete the mounting of the window glass 21. As appears from FIG. 3, the receiving section 4 has a substantially U-shaped configuration, the ends of the legs of which are designed in the same manner as the leg ends of the support section 1, so that a uniform type of mounting for the rubber strips 22 is obtained. The receiving section 4 further is provided with a pair of parallel extending guide flanges 24, which together with the projections 5 guide the receiving section 4 so as to prevent its lateral displacement relative to the support section 1.

It should have become apparent from the above description of the wall system according to the invention, that the system is of unique simplicity due to its extremely few parts, rendering the invention subject matter clearly superior to the known art.

Figure 4:
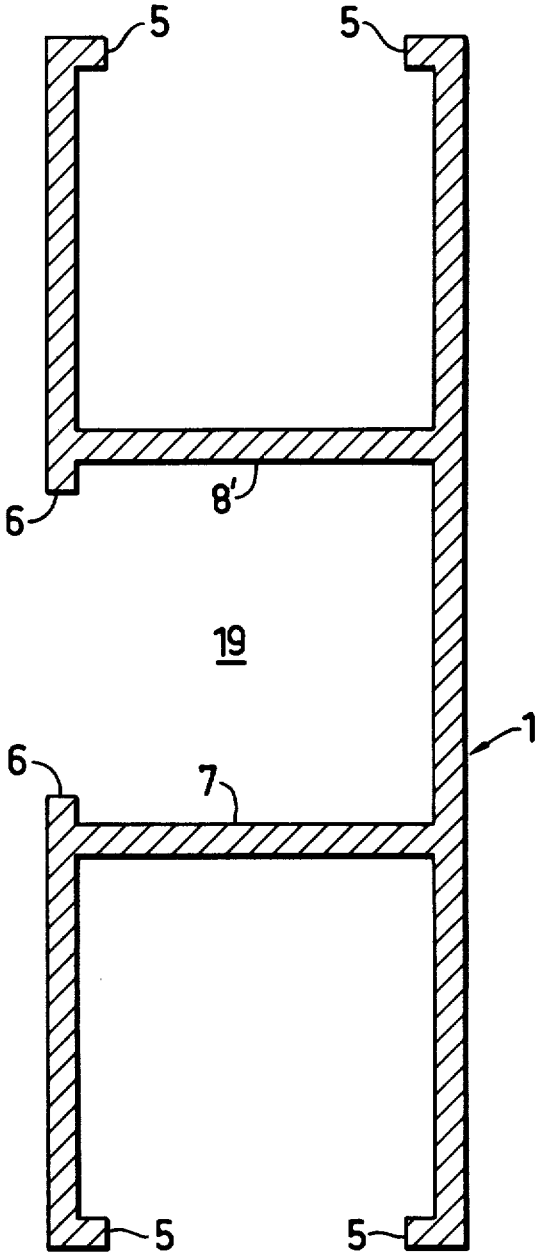
FIG. 4 shows an alternative embodiment of the main section.

The support section 1 also can be given the configuration as shown in FIG. 4, at which the guide edges 8 are replaced by an additional web portion 8'. On one side of the section, between the web portion 7 and the web portion 8', a part has been cut off, forming an opening through the respective leg members to permit access to the space 19 and to form projections 6.

The projections 5, which at this alternative have a simpler shape, and the projections 6 upon onhooking of the section 2 will be located between the hooks 9 and stop members 12 of said section.

What we claim is:

1. An interlocking frame assembly for constructing and supporting a wall system and the like, and comprising:

a plurality of substantially similarly-shaped support sections, each support section having a substantially H-shaped cross-sectional configuration defined by two pairs of oppositely directed leg members attached to one another and a web portion extending therebetween, each pair of said oppositely directed leg members having confronting leg surfaces, with at least one pair of projections formed on each pair of confronting leg surfaces;

each pair of said H-shaped support sections further including at least one pair of parallel extending, spaced flange members attached to an outer surface of said support section and extending substantially perpendicular with respect thereto;

at least one substantially H-shaped connecting means extending between and engaging a pair of said projections formed on confronting leg surfaces of each of two perpendicularly extending support sections for interlocking said perpendicular support sections to one another, and at least one further substantially H-shaped connecting means extending between and engaging a pair of said parallel extending, spaced flange members attached to each of two parallel extending support sections for interlocking said parallel support sections to one another.

2. An interlocking frame assembly according to claim 1, wherein said pairs of oppositely directed leg members forming each of said support sections are spaced apart a sufficient distance to allow a plate-like wall element to be inserted therebetween.

3. An interlocking frame assembly according to claim 1, wherein said support sections each include a pair of spaced web portions extending between said pairs of oppositely directed leg members, with an opening formed through one of the leg members extending between said spaced web portions.

4. An interlocking frame assembly according to claim 1, wherein substantially U-shaped receiving sections are selectively mounted on said support sections, said U-shaped receiving sections including a bottom portion and a pair of guide flanges attached to said bottom portion, with said guide flanges extending between a pair of said parallel extending leg members forming said support section to retain said receiving section in contact with said support section.

5. An interlocking frame assembly according to claim 4, wherein said U-shaped receiving section is adaptable for supporting an end portion of a window assembly and the like mounted in said wall assembly.

6. An interlocking frame assembly according to claim 1, wherein support means engage a pair of parallel extending support sections for supporting said support sections relative to a reference surface such as ground level.

7. An interlocking frame assembly according to claim 6, wherein said support means comprises an attachment section having a substantially straight middle portion and a pair of substantially L-shaped end portions attached to either end of said middle portion, said support means further comprises a rod-like member extending between said middle portion and a reference surface such as ground level, wherein each of said L-shaped end portions supports one of said parallel extending support sections resting thereon.

8. An interlocking frame assembly according to claim 1, wherein each of said support sections further includes a pair of guide edges formed on a pair of confronting leg surfaces, said pair of guide edges substantially aligned with and extending toward one another, with said pair of guide edges spaced from said web portion of said support section a distance corresponding to a length of said substantially H-shaped connecting means, allowing insertion of said substantially H-shaped connecting means into at least one of said perpendicularly disposed support sections to provide attachment therewith.

9. An interlocking frame assembly according to claim 8, wherein each support section defines a center section located a substantially equal distance between said respective pair of guide edges and said respective web portion.

10. An interlocking frame assembly according to claim 1, wherein each pair of parallel extending, spaced flange members include confronting flange surfaces, with at least one pair of projections formed on each pair of confronting flange surfaces.

11. An interlocking frame assembly according to claim 10, wherein said pair of projections formed on said confronting flange surfaces are substantially aligned with one another and are inwardly directed toward one another.

12. An interlocking frame assembly according to claim 1, wherein said pair of projections formed on confronting leg surfaces are substantially aligned with one another and are inwardly directed toward one another.

13. An interlocking frame assembly according to either claims 12 or 11, wherein said H-shaped connecting means comprises a connecting section of substantially H-shaped cross-sectional configuration defined by two pairs of oppositely directed leg members attached to one another and further including a web portion extending therebetween, each pair of oppositely directed leg members including a pair of aligned, outwardly directed projections formed on opposed, outer leg surfaces with each pair of said outwardly directed projections engaging inwardly directed projections formed on a support section.

14. An interlocking frame assembly according to claim 13, wherein said two pairs of oppositely directed leg members forming said connecting section are formed with a distance between opposed, outer surface portions which substantially corresponds to a distance between confronting leg surfaces of said support sections and also substantially corresponds to a distance between confronting flange surfaces of said pair of parallel extending, spaced flange members attached to said support section.

15. An interlocking frame assembly according to claim 13, wherein said outwardly directed projections attached to said connecting section each form a substantially hook-shaped configuration slightly countersunk with respect to a lateral surface of said attached leg member.

16. An interlocking frame assembly according to claim 13, wherein at least one tongue-like locking section is attached to one of said leg members forming each of said pairs of oppositely directed leg members of said connecting section, each of said tongue-like locking sections having a width sufficient to selectively frictionally engage a remaining leg member of each pair of oppositely directed leg members, with said tongue-like locking sections locking each pair of said leg members into frictional contact with said inwardly directed projections formed on one of said support sections.

17. An interlocking frame assembly according to claim 16, wherein each of said tongue-like locking sections is attached to a portion of one of said leg members located adjacent to one of said outwardly directed projections, with each of said tongue-like locking sections initially inclined toward said web portion of said connecting section.

* * * * *